Patented Nov. 21, 1944

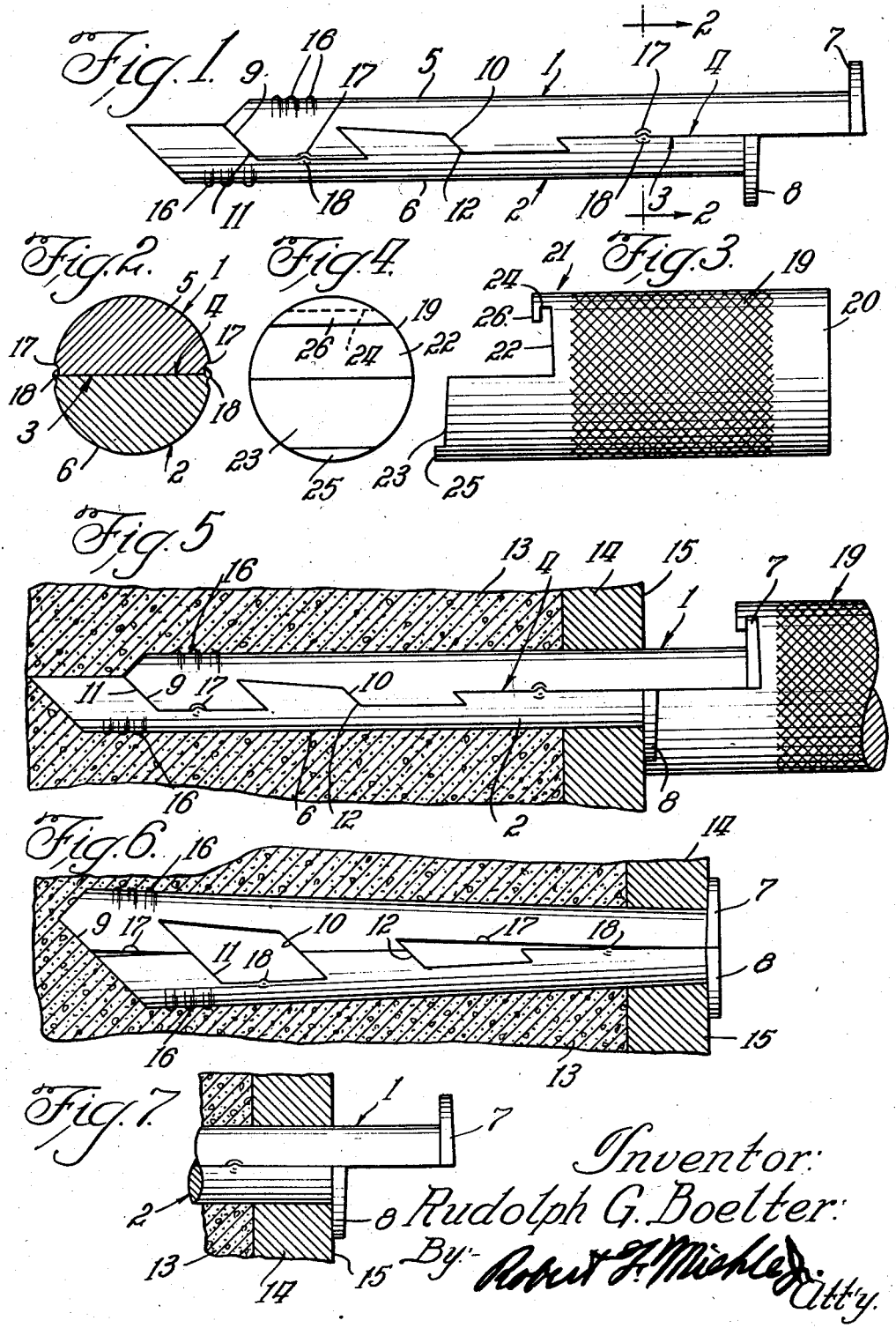

2,362,969

UNITED STATES PATENT OFFICE 2,362,969

EXPANSION NAIL OR THE LIKE

Rudolph G. Boelter, Chicago, Ill.

Application July 8, 1942, Serial No. 450,122

2 Claims. (Cl. 85—23)

My invention relates to a driven fastening device which is transversely expansible as an incident of its installation and to a driving tool therefor which facilitates such installation.

An object of the invention resides in the provision of a novel, simple and effective driven fastening device or nail which is transversely expansible as an incident of its installation to provide an exceptionally firm or strong bond between it and the structure into which it is driven.

With this object in view, my invention consists in certain features of novelty in the construction, combination and arrangement of parts by which the said object and certain other objects, hereinafter appearing, are effected, all as fully described with reference to the accompanying drawing, and more particularly pointed out in the appended claims.

In the said drawing—

Figure 1 is a side elevation of an expansion nail embodying my invention;

Figure 2 is a cross section of the same, substantially on the line 2—2 of Figure 1;

Figure 3 is a side elevation of a driving tool of my invention adapted to be used in driving the aforesaid expansion nail;

Figure 4 is an end elevation of the driving tool;

Figure 5 is a side elevation of the expansion nail and driving tool in driving relation with the nail showing the nail partially driven into a structure (shown in section) and prior to the transverse expansion thereof as hereinafter explained;

Figure 6 is a side elevation of the expansion nail in completely driven and transversely expanded condition in the aforesaid structure (shown in section); and Figure 7 is a side elevation of the expansion nail in the partially driven condition thereof, as shown in Figure 5, but with the driving tool removed pursuant to the final driving operation, as hereinafter explained.

Referring to the drawing, two elongated correspondingly extending fastening members 1 and 2 of part circular cross section are disposed to cooperatively form a nail-like fastening device of circular cross section by reason of the flat or chord surfaces thereof, respectively generally designated at 3 and 4, being opposed so that the part circular surfaces thereof, respectively indicated at 5 and 6, continue each other, the fastening members being relatively movable longitudinally and transversely. See particularly Figures 1 and 2. These fastening members are provided respectively at corresponding driving ends thereof with transversely enlarged driving heads 7 and 8 of part circular cross section disposed with respect to the fastening members to cooperatively form a circular head when in transversely alined relation as shown in Figure 6.

A plurality of pairs of opposingly projecting cooperating cam formations are spaced longitudinally of the fastening members 1 and 2 of which the cam formations of each pair are respectively formed integrally on the fastening members at the opposing or chord surfaces 3 and 4 thereof, the cam formations of the fastening member 1 being designated at 9 and 10, and those of the fastening member 2 being designated at 11 and 12. These cam formations of the fastening members are alinably positionable longitudinally of the fastening members in relative longitudinal positions thereof in which the driving heads 7 and 8 are remote to provide a transversely contracted relation of the fastening members, as illustrated in Figures 1, 2, 5 and 7, and are operative with relative longitudinal movement of the fastening members from said relative positions toward relative positions in which the driving heads are transversely alined to transversely expand the fastening members from their transversely contracted relation as illustrated in Figure 6.

The pair of cam formations 9 and 11, which are relatively remote from the driving heads 7 and 8, are of greater height or rise than the pair of cam formations 10 and 12, which are relatively adjacent the driving heads. That is to say, the pairs of cam formations are graduated in height or rise toward a minimum in the direction of the driving heads, so that the fastening members 1 and 2 are transversely expanded into tapered relation diminishing toward the driving heads as the driving heads approach transversely alined relation. As a result, the driving head portions of the fastening members are not transversely expanded or, at the most, they are expanded to a minimum extent.

In the driving of the fastening device into a structure, illustrated in Figures 5, 6 and 7, and comprising a base or wall element 13 such as may be plaster and an element 14 of other material overlying the wall for the purpose of securing the element 14 on the element 13, the fastening device is initially driven through the element 14 into the element 13 with the fastening members 1 and 2 maintained in their transversely contracted driving head remote relation until the innermost driving head 8 of the fastening member 2 is in the desired relation with the outer surface 15 of the outer element 14, say when the driving head 8 engages this surface as shown in Figures 5 and 7. Then the fastening member 1, having the outermost driving head 7, is individually driven with respect to the fastening member 2 until the driving head 7 transversely alines with the driving head 8 as shown in Figure 6. This individual driving of the fastening member 1 relative to the fastening member 2 causes the cams 9, 10, 11 and 12 to transversely expand the fastening members from their initial transversely contracted relation as shown in Figure 6 and thus effects a strong compression bond between the fastening device and the inner element 13. By reason of the graduation of the height or rise of the pairs of cam formations toward a minimum in the direction of the driving ends or heads of the fastening members 1 and 2, the fastening members, in their transversely expanded relation, form a wedge graduating toward a minimum in the direction of their driving ends or heads, thereby increasing the resistance against withdrawal of the fastening members from the inner element 13 and minimizing or eliminating undesirable transverse expansion of the fastening members at the outer element 14. The inner portions of the curved outer surfaces 5 and 6 are preferably provided with transversely extending teeth 16 to increase this bond.

Preferably, yieldable securing means is provided for initially securing the fastening members in their transversely contracted relation and which is adapted to permit relative movement of the fastening members as an incident of individually driving the fastening member 1 relative to the fastening member 2. As shown, this means comprises depressions 17 formed in the curved surface 5 of the fastening member 1 immediately adjacent the opposite longitudinal edges thereof and into which projections 18 of the fastening member 2 are engaged, the projections disengaging from the depressions as the fastening member 1 is driven relative to the fastening member 2. As an alternative, the fastening members may be initially secured in their transversely contracted relation by a frangible bond, such as glue, between the chord surfaces 3 and 4 of the fastening members.

The tool of my invention is utilized for initially driving the fastening members 1 and 2 in their transversely contracted relation and, as shown, is in the form of an elongated tool 19 having an anvil end 20 for impact from a hammer and an opposite driving end generally designated at 21, as illustrated in Figures 3, 4 and 5. This driving end is provided with two axially spaced and facing abutment surfaces 22 and 23, extending on opposite sides of an axial plane of the tool and respectively engageable with the driving heads 7 and 8 of the fastening members 1 and 2, as illustrated in Figure 5, when the fastening members are in their relative longitudinal positions in which they are in transversely contracted relation for simultaneously driving the fastening members in this relation as the initial driving operation. After this initial driving operation, the tool is removed from engagement with the driving heads, as illustrated in Figure 7, and the outermost driving head 7 is struck to drive the fastening member 1 relative to the fastening member 2 to transversely expand the fastening members and to transversely aline the driving heads 7 and 8 as illustrated in Figure 8.

The driving end 21 of the tool is also provided with opposingly related internally facing radial shoulder formations 24 and 25 respectively axially projecting from the abutment surfaces 22 and 23 at the outer edge portions thereof in another axial plane of the tool normal to the above mentioned axial plane thereof, which shoulder formations are respectively engageable over the edges of the driving heads 7 and 8 to radially confine the driving heads during the driving thereof by the tool. The driving end 21 of the tool is also provided with an overhang formation 26 on and extending from the shoulder formation 24 of the innermost abutment surface 22 radially inward from this shoulder formation and providing a shoulder surface axially spaced from and facing this abutment surface and engageable over the inner surface of the driving head 7 for the confinement of this head axially of the tool between the overhang formation and the abutment surface 22 for further properly positioning the driving tool in driving relation with the fastening members 1 and 2.

While I have thus described my invention, I do not wish to be limited to the precise details described, as changes may be readily made without departing from the spirit of my invention, but having thus described my invention, I claim as new and desire to secure by Letters Patent the following:

1. In a device of the character described, the combination of a plurality of elongated correspondingly extending fastening members relatively movable longitudinally and transversely thereof and having corresponding driving ends, and a plurality of sets of cooperating cam formations spaced longitudinally of said members and graduating in rise toward a minimum in the direction of said driving ends and of which the cam formations of each set are respectively on said members at the opposing faces thereof, said cam formations being alinably positionable longitudinally of said members in relative longitudinal positions thereof in which said driving ends are remote to provide a transversely contracted relation of said members and operative with relative longitudinal movement of said members from said relative positions toward relative positions in which said driving ends are less remote to transversely expand said members into tapered relation diminishing toward said driving ends from said transversely contracted relation.

2. In a device of the character described, the combination of two elongated correspondingly extending fastening members of part circular cross section disposed to cooperatively form a fastening device of generally circular cross section and relatively movable longitudinally and transversely and provided respectively at corresponding ends thereof with transversely enlarged driving heads of part circular cross section disposed with respect to said members to cooperatively form a generally circular head when in transversely alined relation, and a plurality of pairs of opposingly projecting cooperating cam formations spaced longitudinally of said members of which the cam formations of each pair are respectively on said members at the opposing faces thereof, said cam formations being alinably positionable longitudinally of said members in relative longitudinal positions thereof in which said driving heads are remote to provide a transversely contracted relation of said members and operative with relative longitudinal movement of said members from said relative positions toward relative positions in which said driving heads are transversely alined to transversely expand said members from said transversely contracted relation.

RUDOLPH G. BOELTER.